(12) United States Patent
Huang et al.

(10) Patent No.: US 8,542,276 B2
(45) Date of Patent: Sep. 24, 2013

(54) OBJECT TRACKING METHOD AND APPARATUS FOR A NON-OVERLAPPING-SENSOR NETWORK

(75) Inventors: Chung-Hsien Huang, Tainan (TW); Cheng-Chuan Chou, Kaohsiung (TW); Ruei-Cheng Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 682 days.

(21) Appl. No.: 12/758,812

(22) Filed: Apr. 13, 2010

(65) Prior Publication Data

US 2011/0141288 A1 Jun. 16, 2011

(30) Foreign Application Priority Data

Dec. 10, 2009 (TW) .............................. 98142321 A

(51) Int. Cl.
*G06K 9/00* (2006.01)

(52) U.S. Cl.
USPC ........................... 348/152; 382/103; 348/143

(58) Field of Classification Search
None
See application file for complete search history.

(56) References Cited

U.S. PATENT DOCUMENTS

| 7,149,325 | B2 * | 12/2006 | Pavlidis et al. | 382/103 |
| 7,394,916 | B2 | 7/2008 | Brodsky et al. | |
| 2003/0040815 | A1 * | 2/2003 | Pavlidis | 700/48 |

FOREIGN PATENT DOCUMENTS

| CN | 101090485 | 12/2007 |
| CN | 101142593 | 3/2008 |
| CN | 101520502 A | 9/2009 |
| TW | 200708102 | 2/2007 |
| TW | 200806020 | 1/2008 |
| TW | 200824433 A | 6/2008 |
| TW | 200907826 A | 2/2009 |
| TW | 200915852 A | 4/2009 |
| WO | 02/086831 A2 | 10/2002 |

OTHER PUBLICATIONS

China Patent Office, Notice of Allowance, Patent Application Serial No. CN201010002105.2, Oct. 8, 2012, China.
"Robust Real-Time Unusual Event Detection Using Multiple Fixed-Location Monitors", Amit Adam, Ehud Rivlin, Ilan Shimshoni David Reinitz, IEEE Transactions on Pattern Analysis and Machine Intelligence, vol. 30, No. 3, Mar. 2008.
"Video-Based Human Movement Analysis and Its Application to Surveillance Systems", Jun-Wei Hsieh, Yung-Tai Hsu, Hong-Yuan Mark Liao and Chih-Chiang Chen, IEEE Transaction on Multimedia, vol. 10, No. 3 Apr. 2008.
Javed, K. Shafique, and M. Shah, "Appearance Modeling for Tracking in Multiple Non-overlapping Cameras." In CVPR, 2005.

(Continued)

*Primary Examiner* — Scott Christensen
*Assistant Examiner* — Joiya M Cloud
(74) *Attorney, Agent, or Firm* — Rabin & Berdo, P.C.

(57) ABSTRACT

An object tracking method for a non-overlapping-sensor network works in a sensor network. The method may comprise a training phase and a detection phase. In the training phase, a plurality of sensor information measured by the sensors in the sensor network is used as training samples. At least an entrance/exit is marked out within the measurement range of each sensor. At least three characteristic functions including sensor spatial relation among the sensors in the sensor network, difference of movement time and similarity in appearance, are estimated by an automatically learning method. The at least three characteristic functions are used as the principles for object tracking and relationship linking in the detection phase.

16 Claims, 16 Drawing Sheets

(56) References Cited

OTHER PUBLICATIONS

Makris, T. Ellis, and J. Black, "Bridging the gaps between cameras." In Computer Vision and Pattern Recognition, 2004.
Huang, and S. Russell, "Object identification in a Bayesian context." In Proceedings of IJCAI, 1997.
Rahimi, B. Dunagan, and T. Darrell, "Simultaneous calibration and tracking with a network of non-overlapping sensors," In Computer Vision and Pattern Recognition, 2004.
Javed, Z. Rasheed, K. Shafique, and M. Shah, "Tracking across multiple cameras with disjoint views." In ICCV, 2003.
Taiwan Patent Office, Office Action, Patent Application Serial No. TW098142321, Apr. 2, 2013, Taiwan.

* cited by examiner

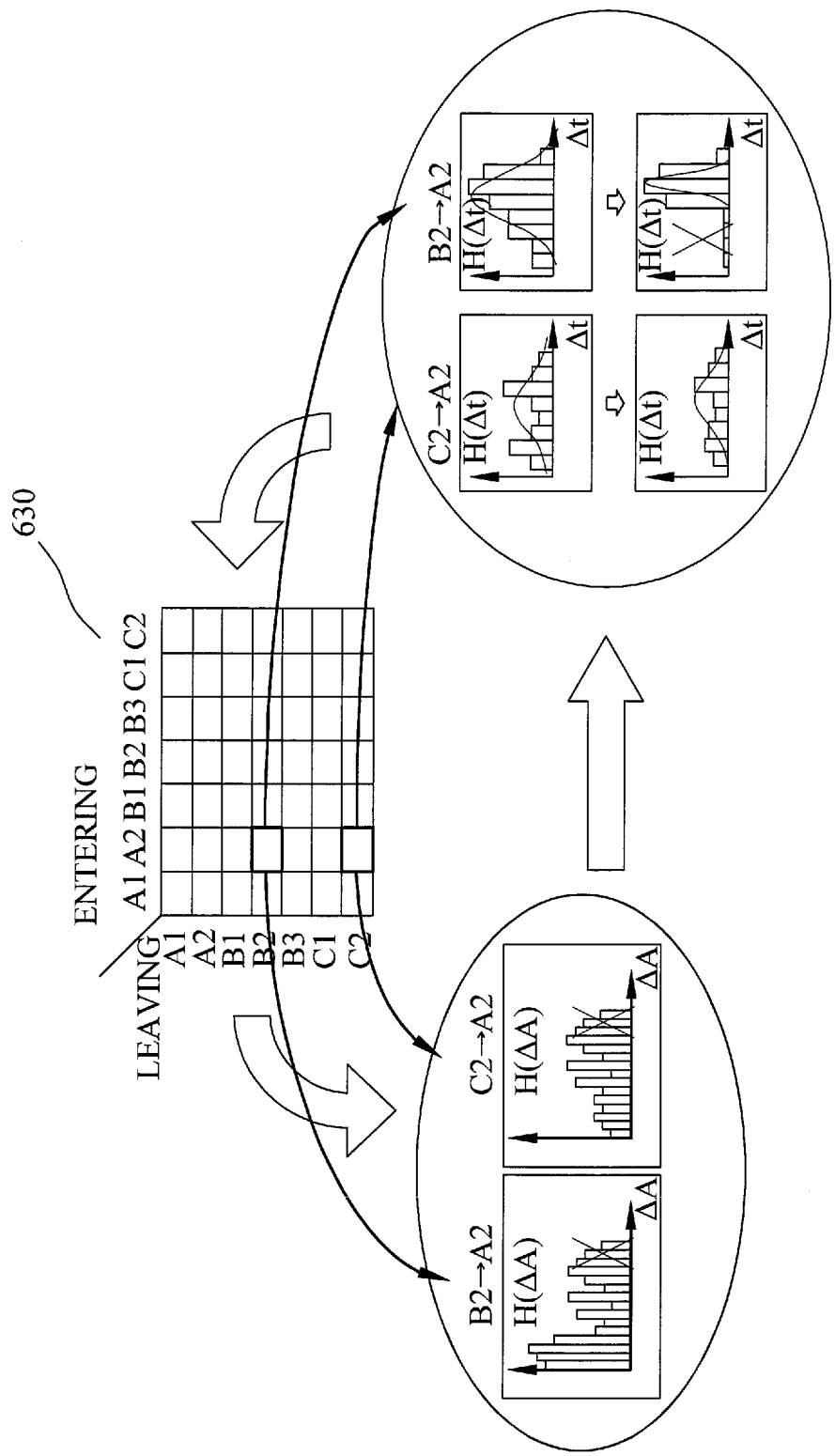

OBJECT TRACKING METHOD AND APPARATUS FOR A NON-OVERLAPPING-SENSOR NETWORK

TECHNICAL FIELD

The disclosure generally relates to an object tracking method and apparatus for a non-overlapping-sensor network.

BACKGROUND

In recent years, automatic surveillance system aided by computer vision technology is gaining attention. Video surveillance system detects the occurrence of abnormal security events by analyzing the behavior of the moving people in monitored video, and effectively notifies the security staff to handle. The basic issues of video surveillance systems, such as, background subtraction, moving object detection and tracking, shadow removal, and so on, are all well researched and documented. High-level event detection, such as, behavior analysis, unattended object detection, loitering detection or jam detection, i.e., automatic and intelligent behavior analysis, is also expected to be in high demand. A steady moving object tracking technology is the basic element of the intelligent video surveillance system.

The measuring range of a single sensor, such as, the field of view (FOV) of a camera, cannot cover the entire environment in surveillance. A camera network with a plurality of cameras is usually designed to exclude overlapping field of view among cameras because of the cost concern. In addition, when the number of cameras increases, the color correction and network structure become complicated. Taiwan Patent Publication No. 200806020 discloses a video tracking technology by using a fixed camera with pre-set priority and a PTZ camera cooperatively tracking an object. When the camera with priority detects moving object, PTZ camera is activated to track the moving object so that the field of view covers the field of view of fixed camera.

Taiwan Patent Publication No. 200708102 discloses a video surveillance system merging data from a plurality of surveillance cameras to monitor a large-area scene, and providing scene map and scale map of the monitored scene, and sensor network model information of the scene to the monitored scene. For example, as shown in FIG. 1, these types of information may be stored in map-FOV image 104, human scale map 108 and camera network model 112, and may be generated and managed by map basic calibrator 102, FOV basic calibrator 106 and camera network model manager 110.

U.S. Pat. No. 7,149,325 discloses a cooperative camera network architecture for recording color characteristic of pedestrians and storing in a database for human identification, where only when the person is in the overlapped part of the cameras, the moving object can be tracked. U.S. Pat. No. 7,394,916 discloses a method for target tracking, aiming at the situation when a human figure appearing in different cameras, comparing the likelihoods of transition of the scene and the other scenes of the previous human figures departing for the basis as human tracking. The likelihoods of transition aim at the blueprint of scene, speed of moving object and the distance to entrances and exits or traffic condition, and are set by the user.

China Patent Publication No. 101,142,593A discloses a method for tracking target in a video sequence. This method compares the changes of appearance feature of the foreground appearing in different cameras. When comparing the different foreground objects, extra comparison is performed when different foreground objects show the state of engagement so as to eliminate the condition that the correct corresponding foreground object cannot be found when the foreground object is in the state of engagement. When comparing different foreground objects in different cameras, the combination of foreground color distribution and edge density information is used to compute the correlation of the foregrounds.

China Patent Publication No. 101,090,485A discloses an image surveillance system and object tracking method, where the functional module of image processing unit 200 is shown as FIG. 2. The image processing unit executes the object detection processing and object tracking processing in detecting moving object of the image. For the tracking processing between different cameras, this unit uses a unique label to correlate the current object and the previous object. When the object tracked is shielded and invisible, the tracking processing will keep the label assigned to the invisible object and the label will be assigned to the object when the object is visible again.

For designing a cross-camera human tracking system, conventionally, manual labeling on corresponding objects is performed by visual inspection in the training phase according to the object color, appearing time, and so on, to find the probability distribution of the different cameras through training samples, and then in the detection phase, the trained probability distribution is used to correlate the cross-camera objects to achieve the cross-camera object tracking.

SUMMARY

The exemplary embodiments may provide an object tracking method and apparatus for a non-overlapping-sensor network, applicable to a sensor network with a plurality of sensors.

In an exemplary embodiment, the disclosed relates to an object tracking method for a non-overlapping-sensor network. The method comprises a training phase and a detection phase. In the training phase, a plurality of data measured by the sensors in the sensor network is used as training samples. At least an entrance/exit is marked out within the measurement range of each sensor. At least three characteristic functions related to an object to be tracked, including sensor spatial relation among the sensors in the sensor network, time difference of movement and similarity in appearance, are estimated by an automatic learning method. The at least three characteristic functions are used as the principles for tracking the object and linking relationship of said object in the detection phase.

In another exemplary embodiment, the disclosed relates to an object detection system for a non-overlapping-sensor network. The system comprises a plurality of sensors forming a sensor network, a training-phase processing module, a characteristic function estimating and updating module and a detection-phase tracking module, where at least an entrance/exit is marked out within the measurement range of the plurality of sensors. The training-phase processing module obtains a plurality of measured data by the sensors in the sensor network and used as training samples, and records all the departure events within a previous duration in a training sample space for the entering events in each entrance/exit of each sensor. The characteristic function estimating and updating module uses an automatic learning method and the existing samples in the training sample space to estimate at least three characteristic functions of the object correlation, including function of sensor spatial relation among the sensors in the sensor network, function of time difference of movement and function of similarity in appearance. The detection-phase tracking module uses the at least three characteristic functions as the principles for object tracking and relationship linking in the detection phase.

The foregoing and other features, aspects and advantages of the disclosure will become better understood from a careful reading of a detailed description provided herein below with appropriate reference to the accompanying drawings.

BRIEF DESCRIPTION OF THE DRAWINGS

FIG. 6A-FIG. 6C show an exemplar of the entire training phase, consistent with certain disclosed embodiments.

FIG. 10 shows an exemplary training result with actual correct corresponding relation of FIG. 9, where

FIG. 11 shows an exemplary training result without actual correct corresponding relation of FIG. 9, where

FIG. 12 shows an exemplar describing the inquiry result of finding the correct related events, where

FIG. 13 shows an exemplar describing the inquiry result of inability to find the correct related events, where

DETAILED DESCRIPTION OF THE EXEMPLARY EMBODIMENTS

Moving object tracking for non-overlapping sensors is defined for a sensor network having k sensors (e.g., sensor C_1, sensor C_2, ..., sensor C_k), and each sensor including nk entrances/exits. For example, in the measurement range of sensor C_1, there exist a_1, a_2, ..., a_n1 entrances/exits, in the measurement range of sensor C_2, there exist b_1, b_2, ..., b_n1 entrances/exits, and so on. An entrance/exit is where an object appears in for disappears from the region of the measurement range of the sensor. Assume that the entrances/exits are well defined for the measurement range of each sensor, and the object tracking in the measurement range of the sensor is solved, the object tracking in non-overlapping sensors may be viewed as solving the related problem of objects entering and leaving different entrances/exits and the objects observed at different entrances/exits at different time.

In the disclosed exemplary embodiments, the sensor may be a sensor of various types, such as, color video camera, with a camera network to track the object movement, but is not limited to this type of sensor. The sensor may be black-and-white camera, heat-sensor camera, infrared camera, microphone, supersonic, laser distance-measurement instrument, weight scale, and so on.

Figure 1:
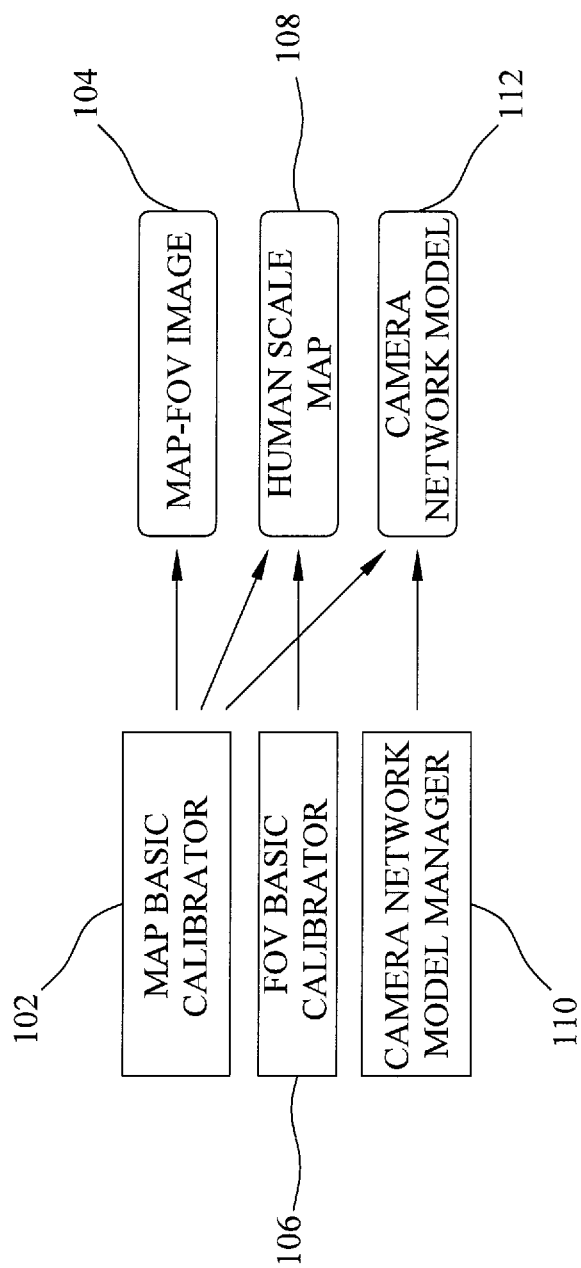
FIG. 1 shows an exemplary schematic view of the scene model manager of a large-area scene-based video surveillance system.
Figure 2:
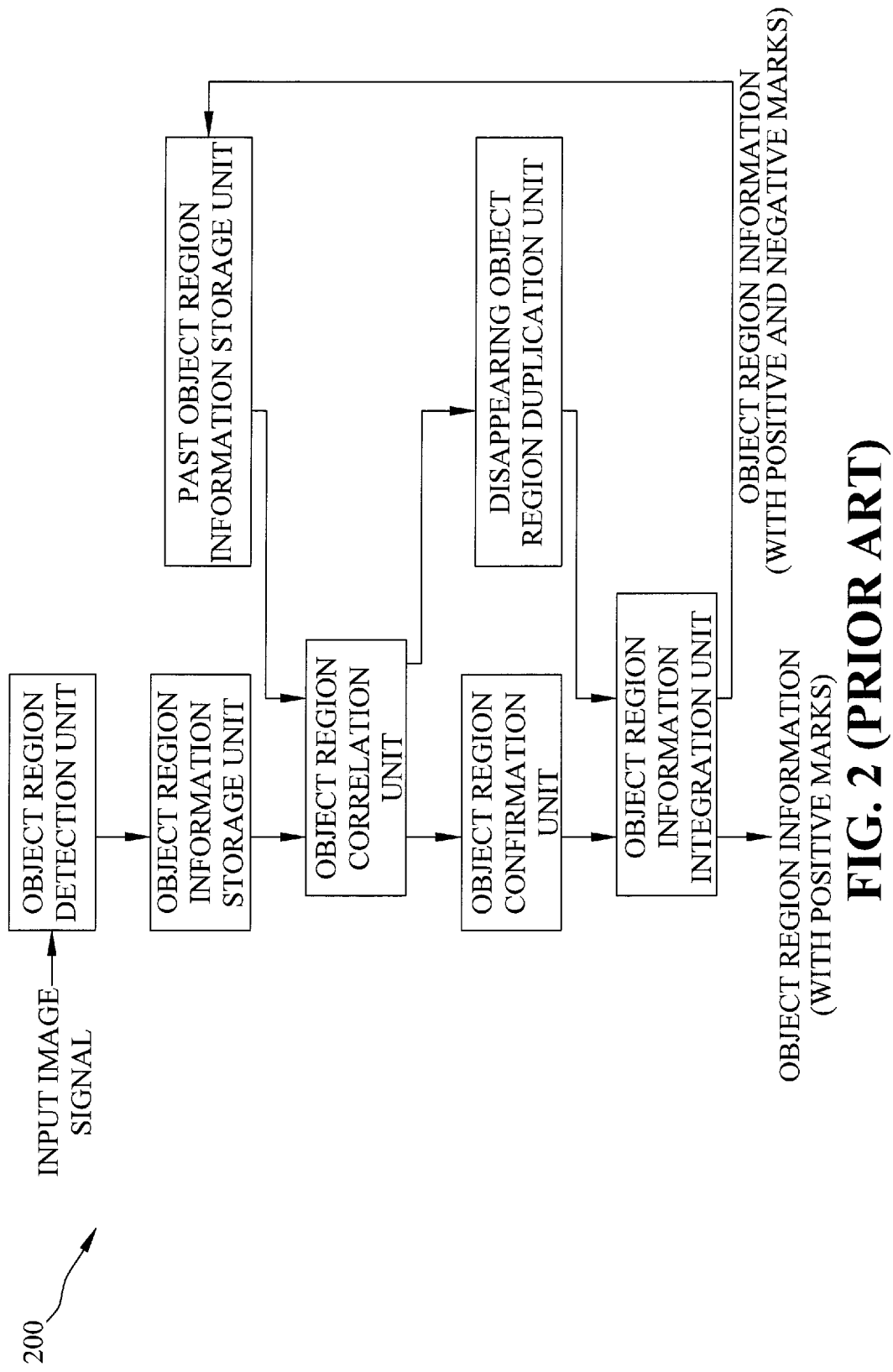
FIG. 2 shows an exemplary schematic view of the functional modules of an image processing unit of an image surveillance system.
Figure 3A:
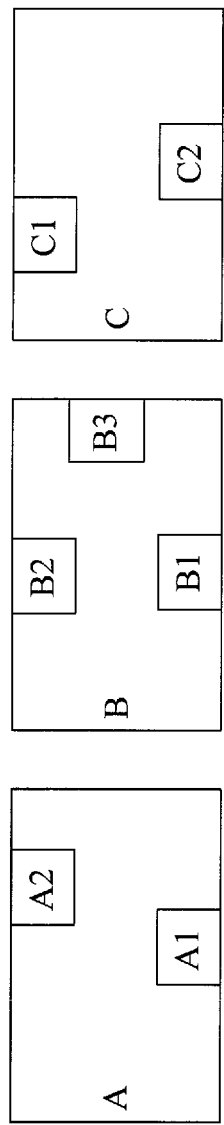
FIG. 3A shows an exemplary schematic view of the FOV and entrance/exit of each camera of a camera network, consistent with certain disclosed embodiments.
Figure 3B:
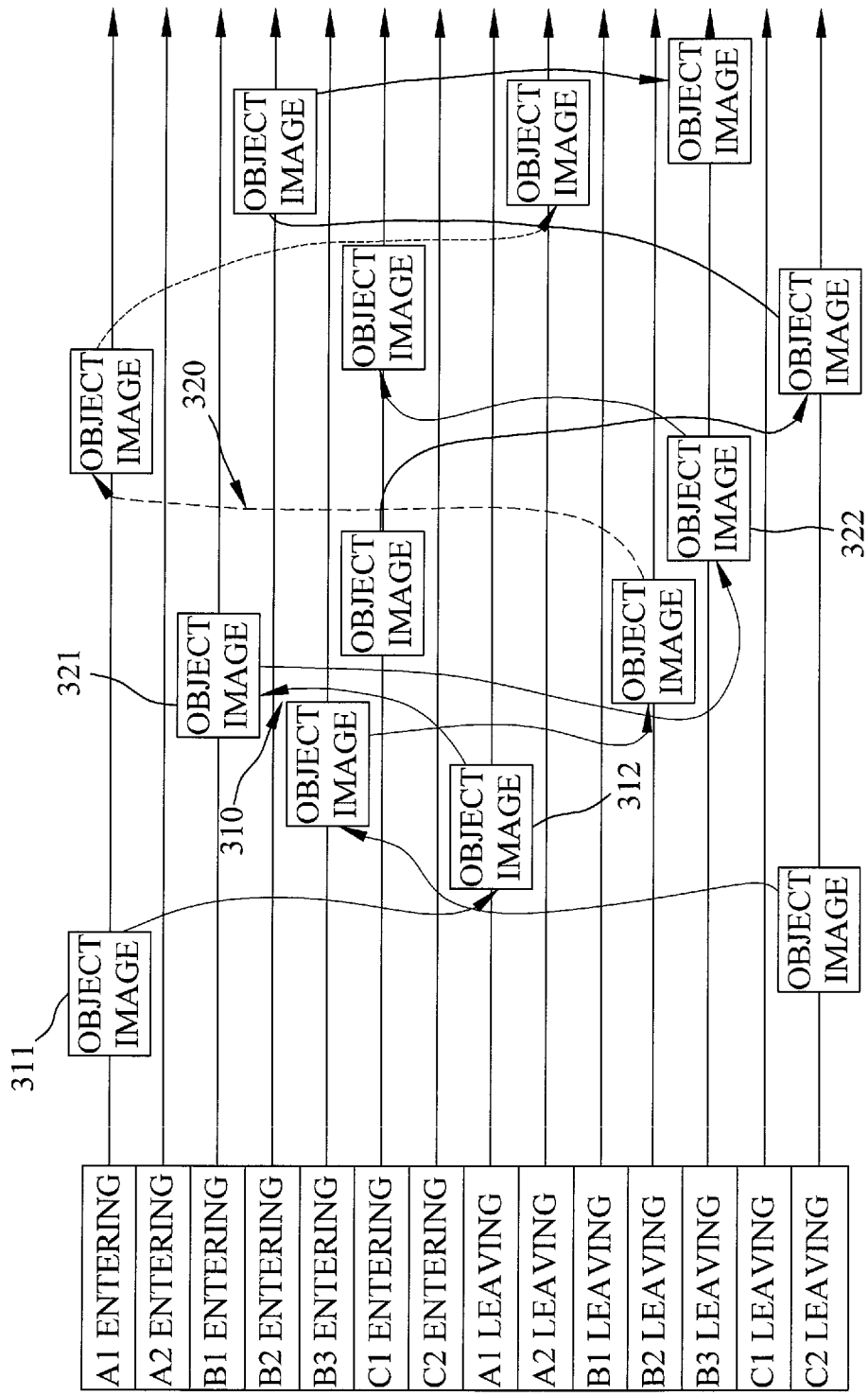
FIG. 3B shows an exemplary schematic view of the equivalence of the non-overlapping-camera object tracking problem and the object correlation problem of objects observed at different time and different entrance/exit, consistent with certain disclosed embodiments.

Take the camera sensor with the measurement range as the field of view (FOV) of the camera as an example. Assume that the three cameras have FOV as A, B, C respectively. FOV A includes entrances/exits A1, A2, FOV B includes entrances/exits B1, B2, B3 and FOV C includes entrances/exits C1, C2, as shown in FIG. 3A. Assume that 14 different object images are observed at different time at the entrances/exits, as shown in FIG. 3B. For example, object image 312 leaves FOV A1 and disappears from FOV A, object image 321 enters B1 and appears in FOV B, object image 322 leaves B3 and disappears from FOV B, and object image 331 enters C1 and appears in FOV C. The object tracking for non-overlapping cameras is to establish the correct correlation (dash line 310) between object image 312 and object image 321 and correlation (dash line 320) between object image 322 and object image 331. In this manner, the object tracking for non-overlapping cameras may be accomplished by establishing the correct correlation between the object images (shown as the connections with the dash lines).

Take a human figure as an example. If O_i_p represents a person p is observed at entrance/exit I, the appearance characteristic O_i_p(a) and the time difference between leaving an entrance/exit and entering another entrance/exit another characteristic O_i_p(t) as the related basis to accomplish object tracking. In addition, a momentum event M((i,j),(p,q)) may be defined to represent person p leaving a camera FOV at entrance/exit i and person q entering a camera FOV at entrance/exit j. if the leaving person and the entering person is the same person, p=q.

In this manner, the person correlation problem may be expressed as the conditional probability P(M((i,j),(p,q))|O_i_p,O_j_q). The value of the probability is the probability that person p and person q are the same person leaving entrance/exit i and entering entrance/exit j given the condition of observation value (O_i_p,O_j_p), where i and j belong to different cameras. Therefore, if a person q is observed at time t entering an entrance/exit j, and an event set E={O_i1_p1, O_i2_p2, ...} occurring at an entrance/exit other than j exists in time duration (t-t_Max), and t_Max is the maximum time required for the camera network moving between any two entrances/exits, then the following equation (1) may be used to find the most probably correlation event to accomplish the human tracking for non-overlapping cameras:

$$O\_i\_p = \arg\max_{\forall O\_i\_p \in E} P(M((i,j),(p,q))|O\_i\_p, O\_j\_q), \quad (1)$$

As aforementioned, for each observation (i.e., moving person), the appearance characteristic difference $\Delta a$ and time difference $\Delta t$ of person moving cross-cameras may be computed as characteristics, and assume that the moving person does not change much in appearance when moving from camera to camera and most people move roughly at the same speed, which are both reasonable assumptions. In this manner, $P(M((i,j),(p,q))|O\_i\_p, O\_j\_q)$ of equation (1) may be rewritten as follows according to Bayes rule:

$$P(M((i,j),(p,q))|O\_i\_p, O\_j\_q) =$$

$$\frac{P(O\_i\_p, O\_j\_q | M((i,j),(p,q))) P(M((i,j),(p,q)))}{P(O\_i\_p, O\_j\_q)} =$$

$$\frac{(P(\Delta a(p,q)|M((i,j),(p,q))) P(\Delta t(p,q)|M((i,j),(p,q))) P(M((i,j),(p,q))))}{P(O\_i\_p, O\_j\_q)} \approx$$

$$cP(\Delta a(p,q)|M((i,j),(p,q))) P(\Delta t(p,q)|M((i,j),(p,q))) P(M((i,j),(p,q)))$$

Because $P(O\_i\_p, O\_j\_q)$ may be approximated with a uniform distribution, thus, represented by a constant c. Similarly, $P(M(i,j),(p,q))$ is proportional to $P(M(i,j))$, thus equation (1) may be rewritten as:

$$O\_i\_p = \arg\max P(\Delta a(p,q)|M((i,j),(p,q))) P(\Delta t(p,q)|M((i,j),(p,q))) P(M(i,j)),$$

$$\forall O\_i\_p \in E \quad (2)$$

Take person as an example. The meaning of equation (2) implies that when a person q enters a camera FOV at an entrance/exit, where does the person q leave from? The basis of tracking person q is as follows: backtrack all the persons left each camera FOV in previous $\Delta T$ time, and maximize equation (2) and $P(\Delta a(p,q)|M((i,j),(p,q)))$, $P(\Delta t(p,q)|M((i,j),(p,q)))P(M(i,j))$ and $P(M(i,j))$ positive correlation, i.e., positive correlation to the appearance similarity, moving time difference and camera space correlation characteristics. These characteristics may be estimated by probability function. Taking the FOVs and entrances/exits of the three cameras of camera network in FIG. 3A as example, FIG. 4 shows how a person entering FOV of a camera at entrance/exit A2, and the basis of tracking the person's exit point, consistent with certain disclosed embodiments.

Figure 4:
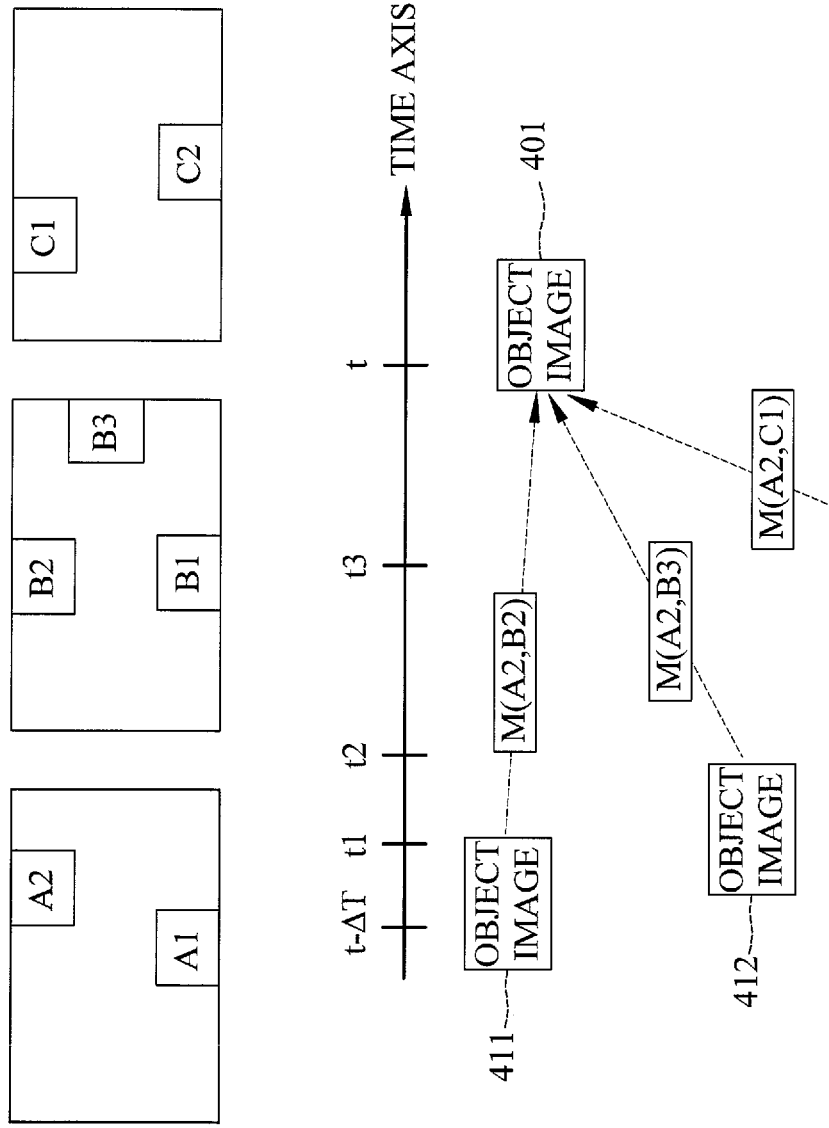
FIG. 4 shows an exemplary schematic view of the basis of tracking a person of the leaving entrance/exit when the person entering entrance/exit to enter the camera FOV, consistent with certain disclosed embodiments.

In the example of FIG. 4, assume that a person at time t enters camera FOV at entrance/exit A2, and the camera image, i.e., camera sample 401, of the entering event is obtained, then all the persons leaving all camera FOVs during previous duration $\Delta T$ may be backtracked, i.e., all the persons leaving FOV of every camera during $(t-\Delta T, t)$. Assume that camera samples 411-413 of three leaving events are found at time t1, t2, t3 from entrances/exits B2, B3, C1, respectively, where the correlation results for leaving from entrances/exits B2, B3, C1 are P1, P2, P3, respectively. Correlation P1 is proportional to appearance similarity, camera spatial correlation M(A1, B2) and moving time difference (t−t1) of camera sample 411; correlation P2 is proportional to appearance similarity, camera spatial correlation M(A2, B3) and moving time difference (t−t2) of camera sample 412; and correlation P3 is proportional to appearance similarity, camera spatial correlation M(A2, C1) and moving time difference (t−t3) of camera sample 413. The person leaving event with the highest similarity may be selected from P1, P2, P3 as the correct correlated event.

The disclosure is to provide moving object tracking in a non-overlapping sensor network, without the need of information of the deployment blueprint of the sensors and any operator involvement in the learning phase. With the large amount of information and machine learning and statistics, the disclosed exemplary embodiments may automatically learn the $P(\Delta a(p,q)|M((i,j),(p,q)))$, $P(\Delta t(p,q)|M((i,j),(p,q)))$ and $P(M(i,j))$ of the above equation (2). That is, the appearance similarity, moving time difference and sensor spatial correlation characteristics. The disclosed exemplary embodiments provide an automatic learning method to estimate the required probability function. This automatic learning method neither needs to specify the number of samples appearing in the training data nor requires to manually label the related persons. This method may be a recursive training method, which will be described momentarily.

Figure 5:
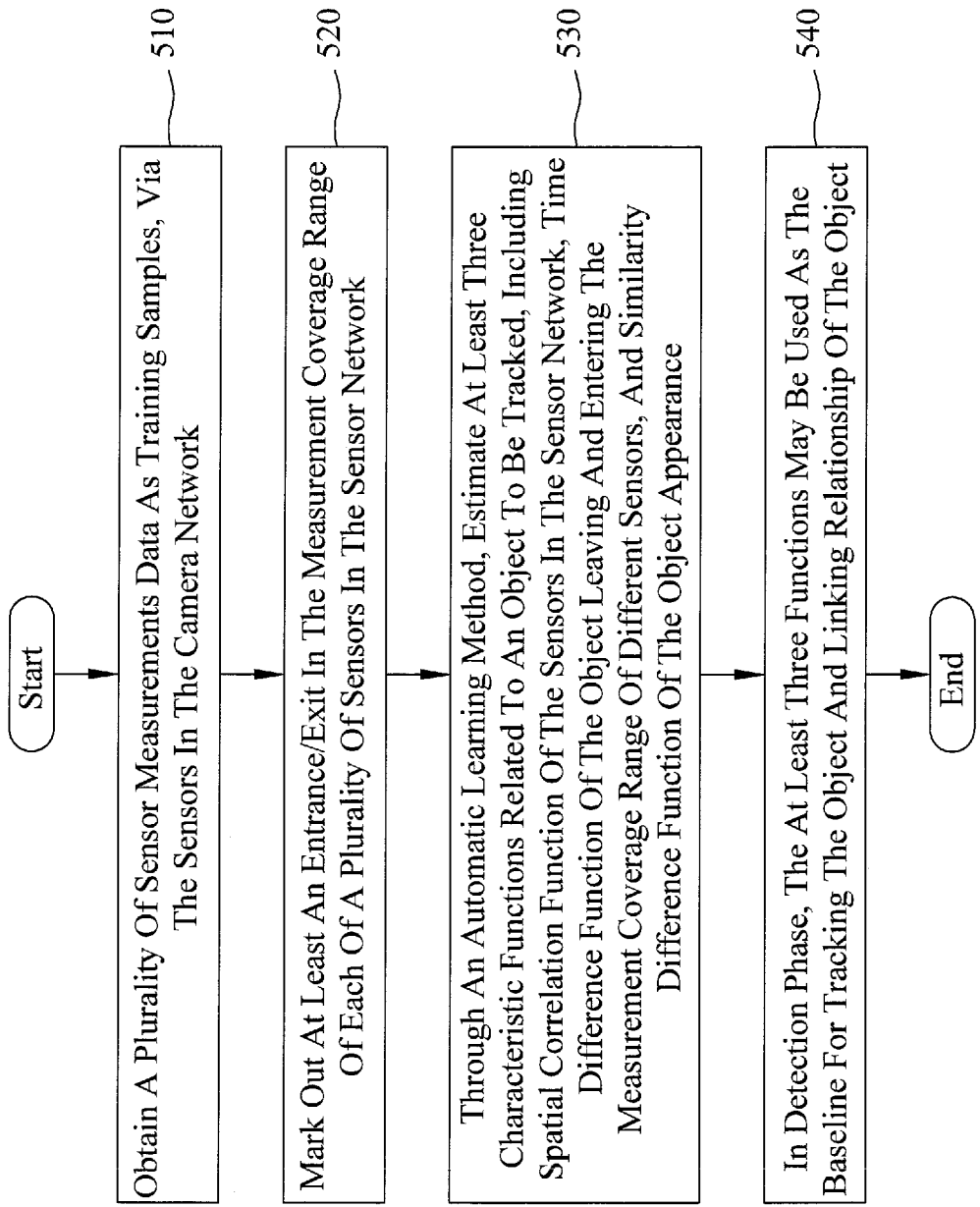
FIG. 5 shows an exemplary flowchart of an object tracking method for a non-overlapping sensor network, consistent with certain disclosed embodiments.

After the training data are allocated to a training sample space according to the entrance/exit, the method automatically estimates spatial correlation of the cameras, the distribution of the leaving and entering time difference and the distribution of the color difference of the object appearance, by measuring the appearance and time characteristics of the moving object, for taking them as the basis of object tracking. Accordingly, the object tracking technology between the sensors may be realized with a training phase and a detection phase. FIG. 5 shows an exemplary flowchart of the method for object tracking in a non-overlapping sensor network, consistent with certain disclosed embodiments.

In the training phase, the method uses a plurality of sensors in the camera network to obtain a plurality of sensor measurements data as training samples, as shown in step 510. In step 520, at least an entrance/exit is marked out within the measurement coverage range of each of the plurality of sensors in the sensor network. In step 530, an automatic learning method is used to estimate at least three characteristic functions related to an object to be tracked, including spatial correlation function of the sensors in the sensor network, time difference function of the object leaving and entering the measurement coverage range of different sensors, and similarity difference function of the object appearance. In detection phase, the at least three functions may be used as the baseline for tracking the object and linking relationship of the object, as shown in step 540.

Figure 6A:
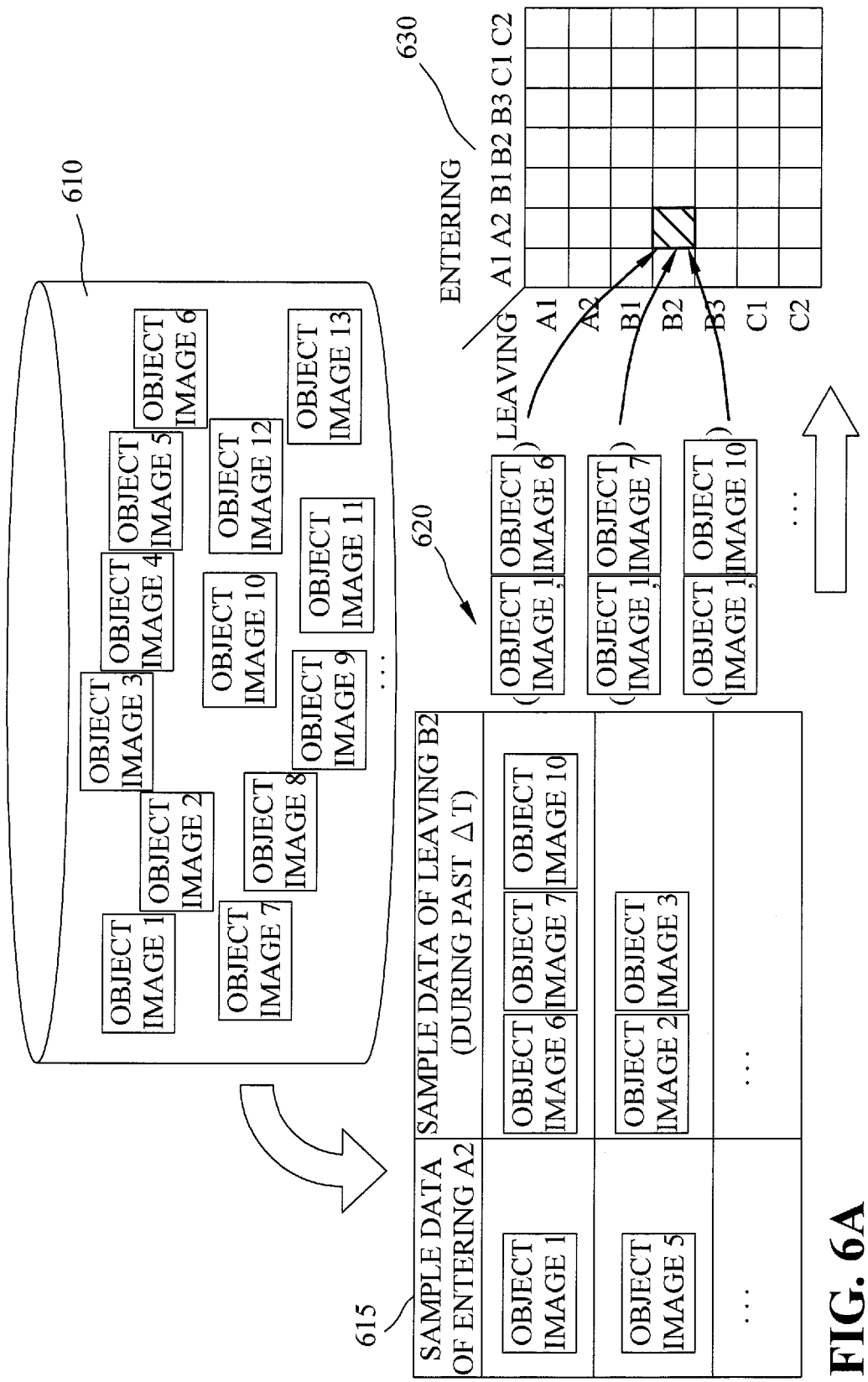

As aforementioned, the automatic learning method may be a recursive learning strategy. FIGS. 6A-6C show the entire training phase, consistent with certain disclosed embodiments.

First, an n×n training sample space may be allocated in a memory, where n is the total number of the entrances/exits in the entire sensor network. Each field of this space is for storing two related entering and exiting events. For example, the space may be represented by an n×n matrix, where the field (d,b) of the n×n matrix represents the event of leaving entrance/exit b during the past period when an object is observed to enter entrance/exit d. For example, if an entering event q at entrance/exit d exists at time t, and a leaving event exists at a different entrance/exit b during the past period (t−t_Max, t), the leaving event is collected and placed inside the (d,b) location in the training sample space, i.e., field (d,b). In other words, each field in the sample space contains a spatial correlation between the sensors.

Take the example of sensor being a camera with the FOV as the measurement coverage range. FIG. 6A shows an exemplary schematic view of allocating a 7×7 training sample space represented by a 7×7 matrix 630, consistent with certain disclosed embodiments. The FOV of the three cameras in the camera network are A, B, C, and the camera network includes 7 entrances/exits. FOV A has entrances/exits A1, A2, FOV B has entrances/exits B1, B2, B3 and FOV C has entrances/exits C1, C2. Assume all training sample data 610 include a plurality of object images, such as, object image 1, object image 2, object image 3, and so on. From training sample data 610, table 615 lists all sample data entering A2, such as, object image 1, object image 5, and so on, and all sample data leaving B2, such as, object image 6, object image 7, object image 10, and so on. Field (A2, B2) of matrix 630 indicates all the leaving B2 events during the past period $\Delta T$ when an object is observed entering A2, such as, (object image 1, object image 6), (object image 1, object image 7), (object image 1, object image 6), and so on, marked as 620. As seen, each field of matrix 630 contains the correlation between the entrances/exits of the three cameras.

After processing all the training sample data, the events stored at location (d,b) are used for training the corresponding probability distribution functions $P(\Delta a|M(d,b))$, $P(\Delta t(|M(d,b))$ and $P(M(d,b))$. Obviously, if two entrances/exits are linked and the object movement takes less time than t_Max, the correct leaving and entering correlation events will be selected and put into the event set. But, similarly, the incorrect events will also be selected and put into the event set. Therefore, a recursive manner may be used to filter out the low confidence events and keep only correct correlation events. With the remained correct events in the sample space, the required corresponding probability distribution function may be estimated successfully.

The disclosed exemplary embodiments target at each field and uses bar chart to represent the appearance difference and time difference of person crossing sensors. For example, the first step is to eliminate anomaly of the statistic distribution of the appearance similarity in each possible link. The second step is to find the data with more obvious time difference among the high appearance similarity data. After repeating the above two steps for many times, if the link does exist, the convergence distribution of time difference and the appearance characteristic difference may be found.

Take field (A2, B2) and field (A2, C2) as an example. The exemplar in FIG. 6B makes a bar statistic chart out of the characteristics of appearance characteristic difference, with x-axis as appearance similarity $\Delta A$ and y-axis as the statistic distribution of appearance similarity $\Delta A$, i.e., $H(\Delta A)$. After eliminating the anomaly, that is, filtering out the potential outliers, i.e., the rightmost data in the bar chart. FIG. 6C shows the finding of the data with obvious time difference from the remaining data with high similarity and using the moving time difference of the object crossing sensors as the characteristic to draw the bar chart, with x-axis as moving time difference $\Delta t$, and y-axis as bar chart, i.e., $H(\Delta t)$. Symbol x indicates the removal of the data.

Bar charts $H(\Delta A)$ and $H(\Delta t)$ may be approximated with a mixture Gaussian model. In bar chart $H(\Delta A)$, a Gaussian model with a smaller mean and variance and other Gaussian models with a larger mean and variance are expected to exist because the coherence of the moving object appearance will make the correct matching to lower the appearance similarity $\Delta A$, i.e., corresponding to Gaussian model with a smaller mean and variance. Similarly, Gaussian model with a larger mean and variance will correspond to the sample outliers which are the part requiring further elimination.

By the same token, if the two entrances/exits have physical spatial link, a Gaussian model with a smaller mean and variance must exist in bar chart $H(\Delta A)$ to correspond to the correct sample, with the mean indicating the moving time required for a person to cross the two entrances/exits and the Gauss model with large variance corresponding to the sample outliers. On the other hand, there is a high probability that any two entrances/exits are not spatially linked; hence, the distribution of $H(\Delta A)$ and $H(\Delta t)$ are more random and uniform, and $P(M)$ approximates 0.

Because the characteristic similarity functions of the entrances/exits have the above traits, the final correct sample may be found by recursive filtering. First, bar charts $H(\Delta A)$ and $H(\Delta t)$ are made for all possible sample statistics. Some potential outliers are filtered from $H(\Delta A)$, i.e., the rightmost data in the bar chart. At the same time, the Gauss value in $H(\Delta t)$ is updated and observed to see whether a concentrate trend exists; if so, continue filtering $H(\Delta A)$ and updating $H(\Delta t)$ until the similarity distribution function converges; otherwise, no concentrate trend exists and $P(M)$ is relatively smaller than other combination, this indicates that these two entrances/exits have no physical spatial link.

Figure 7:
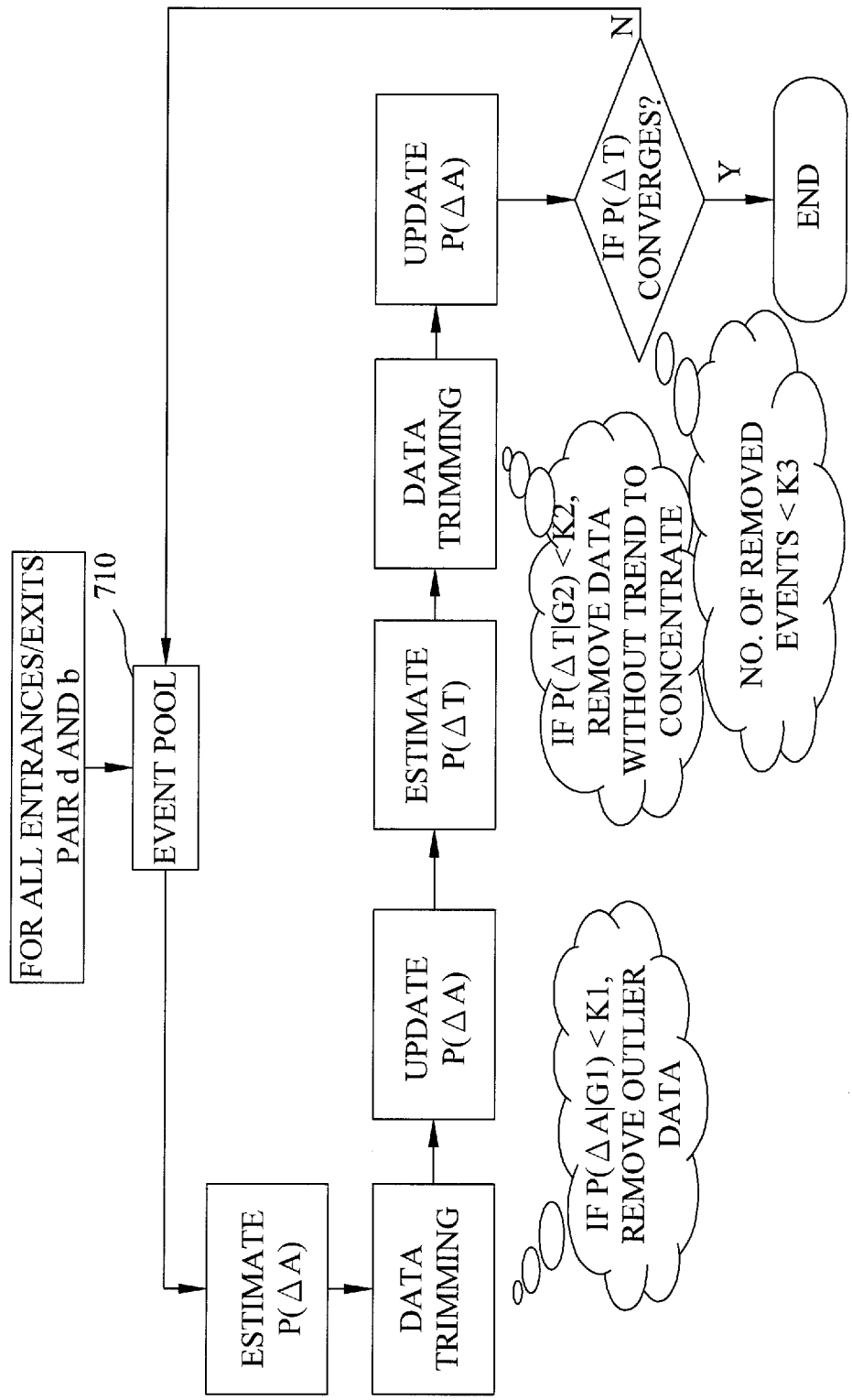
FIG. 7 shows an exemplary schematic block diagram of the design of recursive learning strategy, consistent with certain disclosed embodiments.

FIG. 7 shows an exemplary schematic block diagram of the design of the recursive learning strategy, consistent with certain disclosed embodiments. Referring to FIG. 7, first, all the possible corresponding leaving events are collected to establish an event pool 710 for any two entrances/exits d, b, i.e., all the fields (d,b) of n×n matrix, according to the exemplary embodiment of FIG. 6A. With event pool 710, appearance similarity difference probability function $P(\Delta A)$ and moving time difference probability function $P(\Delta t)$ are estimated and updated, where the estimation and updating of appearance similarity difference probability function includes estimating $P(\Delta A)$, data trimming, and updating $P(\Delta A)$. In the data training, a mixture Gaussian model $G1(\Delta A)$ may be used to approximate appearance similarity difference probability function $P(\Delta A)$ and remove the outliers. The estimation and updating of moving time difference probability function includes estimating $P(\Delta t)$, data trimming, and updating $P(\Delta t)$, where the data trimming may use another mixture Gaussian model $G2(\Delta t)$ to approximate moving time difference probability function $P(\Delta t)$ and remove the data without the trend to concentrate.

After updating $P(\Delta t)$, the next step may determine whether moving time difference probability function converges; if not converging, the process returns to event pool 710 and continues estimating and updating appearance similarity difference probability function $P(\Delta A)$ and moving time difference probability function $P(\Delta t)$; otherwise, the process ends. Removing the outliers may be based on whether the conditional probability function $P(\Delta A|G1)$ is less than a preset value K1 or not. Removing the data without the trend to concentrate may also be based on whether the conditional probability function $P(\Delta t|G2)$ is less than a preset value K2 or not. The condition of convergence for moving time difference probability function $P(\Delta t)$ is, for example, the number of the removed events is less than a preset value K3. The larger K1, K2 are, the higher the ratio of the data removal. Thus, the condition of convergence may be reached faster. However, if K1 and K2 are set to be high, too many events may be removed. The higher K3 is set, the easier the condition of convergence may be met. But, too many events without physical links may remain. The settings of K1, K2, K3 may depend on the actual application, for example, the experience from the experiments.

Figure 8:
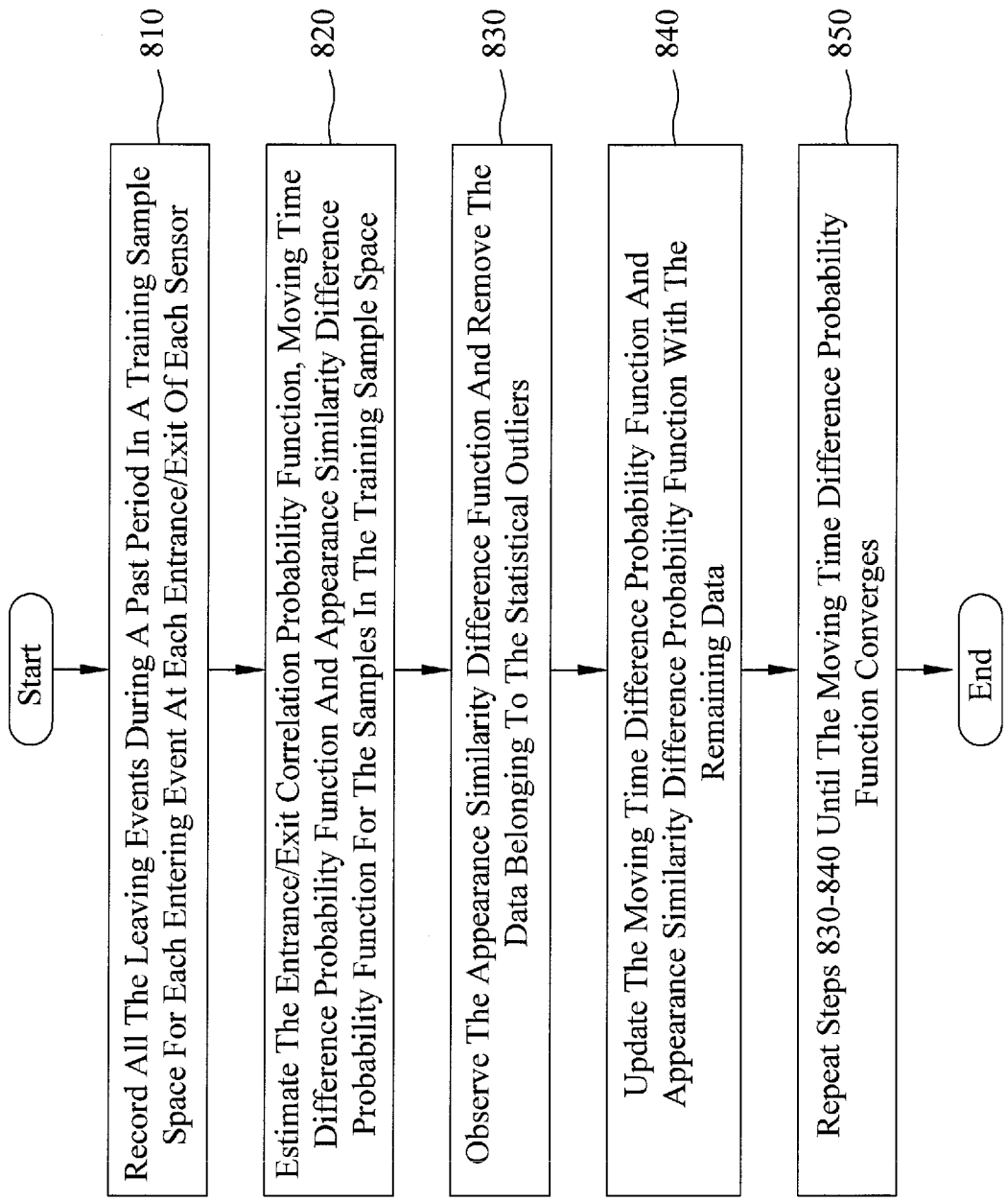
FIG. 8 shows an exemplary flowchart of the method of recursive learning strategy, consistent with certain disclosed embodiments.

Accordingly, FIG. 8 shows an exemplary flowchart illustrating the steps of the recursive learning strategy, consistent with certain disclosed embodiments. Referring to FIG. 8, all the leaving events during a past period in a training sample space are recorded for each entering event at each entrance/exit of each sensor, as shown in step 810. In step 820, with the samples existing in the training sample space, it is to estimate the entrance/exit correlation probability function, moving time difference probability function and appearance similarity difference probability function. In step 830, it is to observe the appearance similarity difference function and remove the data belonging to the statistical outliers. With the remaining data, it is to update the moving time difference probability function and appearance similarity difference probability function, as shown in step 840. Steps 830-840 are repeated until the moving time difference probability function converges, as shown in step 850.

In step 830, it may use a mixture Gaussian model to approximate the appearance similarity difference function. In step 840, before updating the moving time difference probability function, another mixture Gaussian model may be used to approximate the moving time difference probability function and observe whether or not to remove the data without concentrate trend. In step 850, the convergence of the moving time difference probability function may be determined by, for example, whether the number of removed events is less than a preset number. After step 850, the data of the remaining events may be used to estimate the entrance/exit correlation probability function.

Figures 9A, 9B:
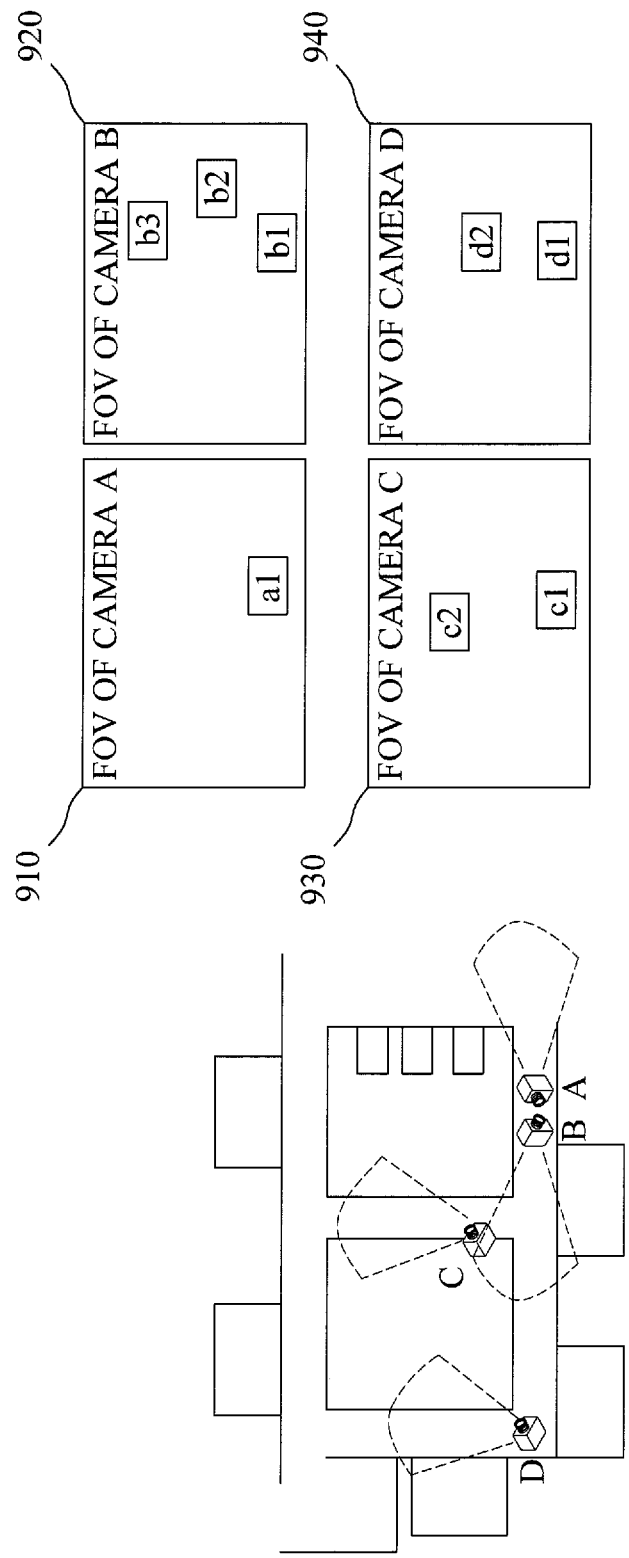
FIG. 9A-FIG. 9B show an exemplary experiment scene and an exemplary camera deployment of a camera network, respectively, consistent with certain disclosed embodiments.

The following uses the camera as the sensor for an exemplar to describe the disclosed moving object tracking method in a camera network. The experiment scene and the camera deployment of the camera network are shown in FIG. 9A and FIG. 9B, respectively. The experiment scene of FIG. 9A is an office and four non-overlapping cameras A, B, C, D, i.e., the areas outlined by dashed lines. In FIG. 9B, FOV 910 of camera A has an entrance/exit a1, FOV 920 of camera B has three entrances/exits b1, b2, b3, FOV 930 of camera C has two entrances/exits c1, c2 and FOV 940 of camera D has two entrances/exits d1, d2.

In the experiment scene, a video clip is used with the first 7 minutes as the training phase and the last minute as the detection phase. In the training phase, the appearance change and time different of each entrance/exit are estimated. In the detection phase, when using a person entering event to inquire, the person leaving events with higher similarity to the person entering event will be listed. All the person leaving events occurred during the time interval (t−t_Max, t), where t is the time the person enters.

Figure 10C:
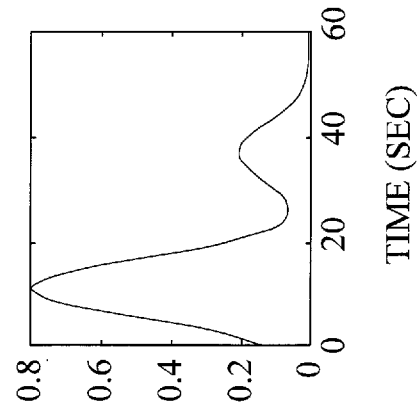
FIG. 10C is the mixture Gaussian model approximating bar chart H($\Delta t$), consistent with certain disclosed embodiments.
Figure 10B:
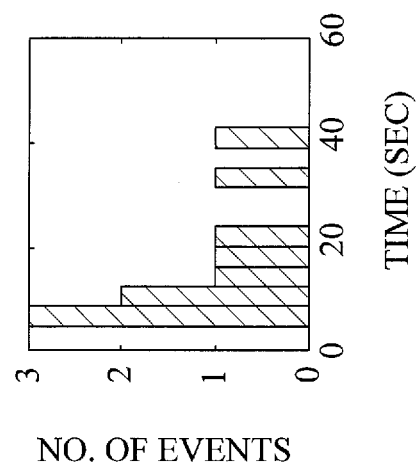
FIG. 10A and FIG. 10B are bar charts H($\Delta A$) and H($\Delta t$), respectively.
Figure 10A:
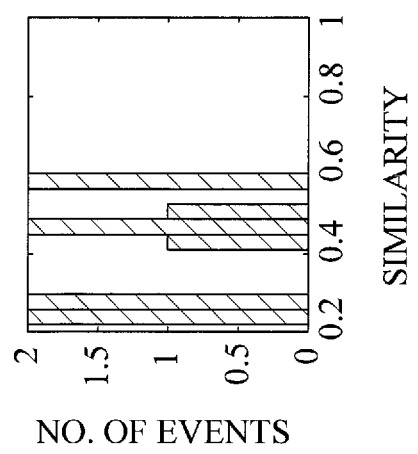

For example, when considering the correlation of entrance/exit a1 of FIG. 9A and entrance/exit b1 of FIG. 9B, according to the experiment result, the training result with actual corresponding relation may be obtained after six recursions. As shown in FIG. 10, FIG. 10A and FIG. 10B show the bar charts $H(\Delta A)$ and $H(\Delta t)$, respectively, and FIG. 10C shows the mixture Gaussian model approximating bar chart $H(\Delta t)$. The x-axis of FIG. 10A is the person similarity in the events, with 0 indicating the highest similarity. The x-axis of FIG. 10B and FIG. 10C is the time of person entering/leaving in the events, with second as unit. The y-axis of FIG. 10 is the number of events.

Figure 11C:
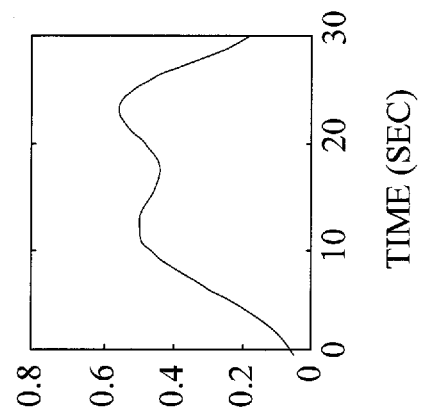
FIG. 11C is the mixture Gaussian model approximating bar chart H($\Delta t$), consistent with certain disclosed embodiments.
Figure 11B:
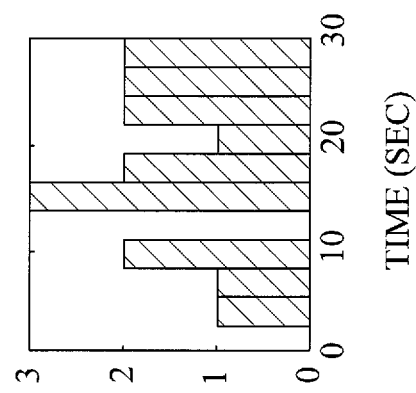
FIG. 11A and FIG. 11B are bar charts H($\Delta A$) and H($\Delta t$), respectively.
Figure 11A:
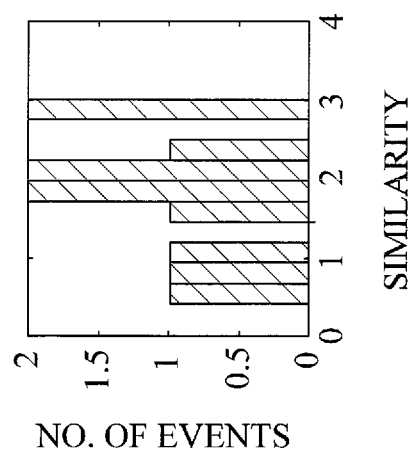

The training result without actual corresponding relation may be shown in FIG. 11. There is a high probability that c1 of FIG. 9B and d1 of FIG. 9B are not spatially linked; therefore, the distribution of $H(\Delta A)$ and $H(\Delta t)$ is more random, shown as FIG. 11A and FIG. 11B, respectively. As uniformly distributed, FIG. 11C shows the approximation probability model, and P(M) approximates 0.

Figure 12B:
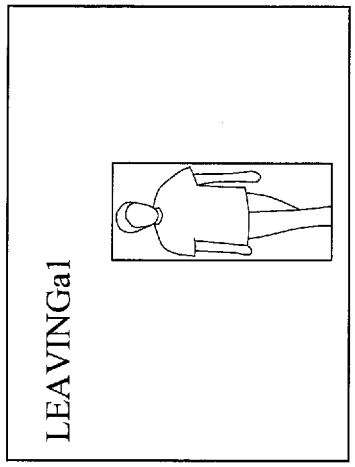
FIG. 12B, FIG. 12C, FIG. 12D are three possible related person leaving events, consistent with certain disclosed embodiments.
Figure 12D:
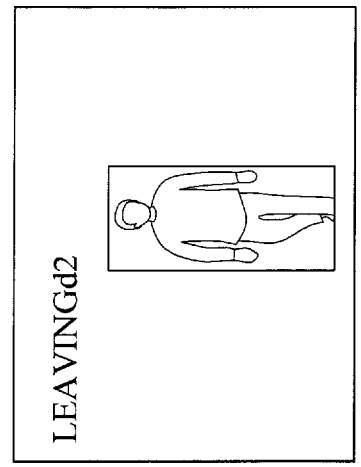
Figure 12A:
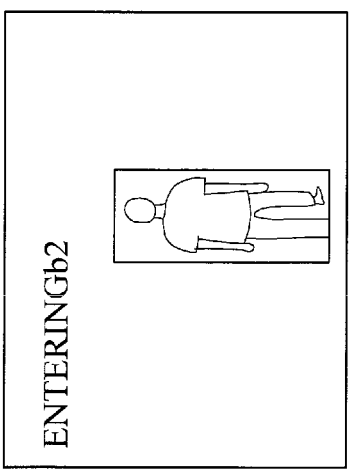
FIG. 12A is the person entering event of inquiry.
Figure 12C:
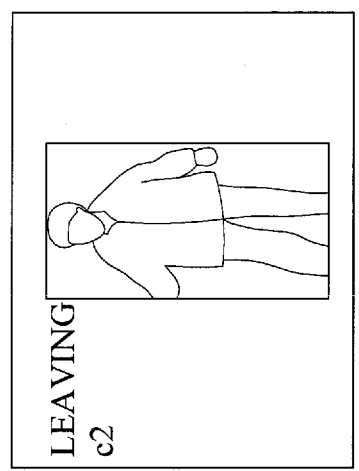

In the detection phase, when using an object (such as, person) entering event to inquire, the results may be either that (1) the person leaving event with highest similarity is the correct correlation event, or (2) no related leaving event is found. The exemplar of FIG. 12 shows the inquiry result of finding the correct related event, where FIG. 12A is camera image of the person entering event (entering b2), and FIG. 12B, FIG. 12C, FIG. 12D are the camera images of found possible person leaving events, i.e., leaving a1, c2, d2, respectively. The correlation results of FIG. 12B, FIG. 12C, FIG. 12D may be computed with equation (2), i.e., the product of $P(\Delta A(p,q)|M((i,j),(p,q)))$, $P(\Delta t(p,q)|M((i,j),(p,q)))$ and $P(M(i,j))$, 0.2609, $2.82*10^{-100}$, and $2.77*10^{-229}$, respectively. The leaving person in FIG. 12B and the inquired entering person is the same one, which indicates the correlation of the correct related event is higher than the others and the inquiry result is correct. In other words, object tracking and correlation rule are positively proportional to the aforementioned appearance similarity, moving time difference and the spatial correlation of cameras, i.e., as equation (2).

Figure 13A:
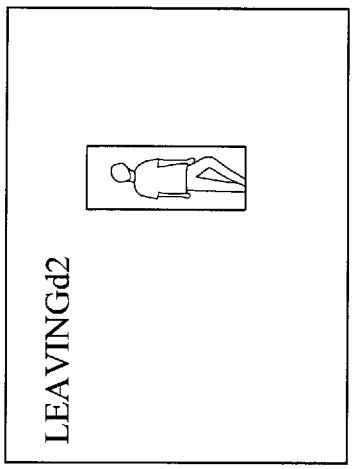
FIG. 13A is the person entering event of inquiry.
Figure 13B:
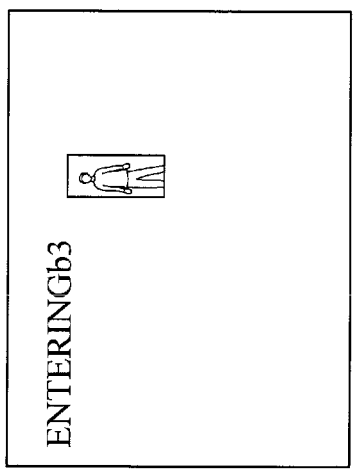
FIG. 13B, FIG. 13C, are two events with very low correlation values, consistent with certain disclosed embodiments.
Figure 13C:
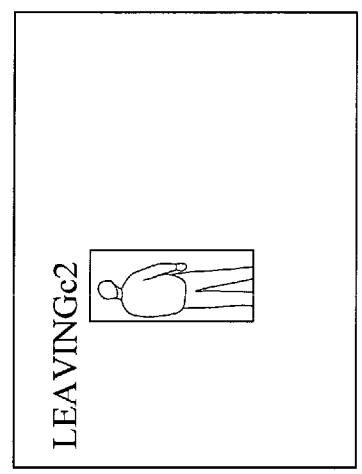

The exemplar of FIG. 13 shows the no corresponding leaving person being found as the inquiry result, where FIG. 13A indicates the person entering event for the inquiry. Because there is no actual related leaving event, the found two related events, i.e., FIG. 13B and FIG. 13C have low correlation values of $7.86*10^{-4}$ and $3.83*10^{-138}$, respectively.

In addition to the color camera network, the disclosed exemplary embodiments may also be applied to other types of sensor networks, such as, black and white camera, thermal sensor camera, infrared camera, microphone, supersonic, laser distance measuring instruments, weight scale, and so on. When extracting distinguishing characteristics of the objects from the measured data sensed by the sensors to replace the appearance characteristics of the color camera, the above method may be successfully applied. For example, when the sensor is the black and white camera or the infrared camera, the appearance characteristic may be the texture or the gray scale intensity distribution of the moving object. When the sensor is the thermal sensor camera, the appearance characteristic may be the object temperature or temperature distribution. When the sensor is the microphone, the appearance characteristic may be audio frequency or the tone of the sounds of the objects. When the sensor is the supersonic, laser distance measurement instrument or weight scale, the appearance characteristic may be the height or weight of the moving object.

Figure 14:
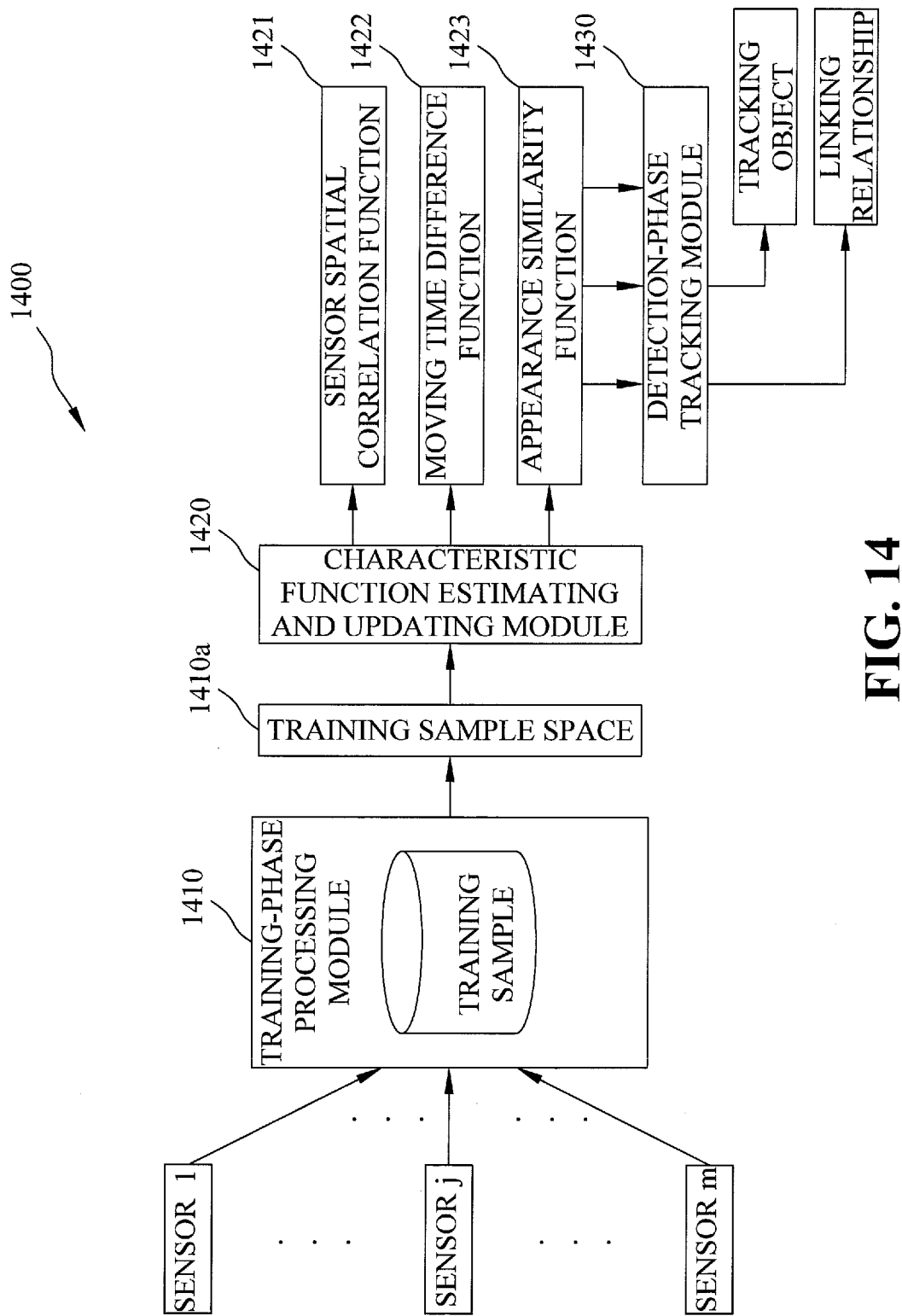
FIG. 14 shows an exemplary schematic view of an object tracking system for a non-overlapping sensor network, consistent with certain disclosed embodiments.

The above object tracking method for a non-overlapping sensor network may be executed on an object tracking system in a camera network. FIG. 14 shows an exemplary schematic view of the object tracking system, consistent with certain disclosed embodiments. In FIG. 14, object tracking system 1400 may comprise m sensors of the sensor network, a training-phase processing module 1410, a characteristic function estimating and updating module 1420 and a detection-phase tracking module 1430, where m sensors are denoted as sensor 1 to sensor m, m≧2. The coverage range of each sensor j is configured to include at least an entrance/exit, 1≦j≦m.

Training-phase processing module 1410 obtains a plurality of measured data through each sensor j as training samples and, for entering events at each entrance/exit of each sensor j, records all leaving events during the past period in a training sample space 1410a. With the existing samples in training sample space 1410a, characteristic function estimating and updating module 1420 may estimate at least three characteristic functions related to an object to be tracked, including sensor spatial correlation function 1421, moving time different function 1422 and appearance similarity function 1423, via an automatic learning method. Detection-phase tracking module 1430 may use the estimated three characteristic functions as the basis for tracking the object and linking relationship of the object.

The plurality of sensors may be deployed in a non-overlapping sensor network. Assume that n entrances/exits are configured in the measurement ranges of m sensors, an n×n training sample space may be allocated in a memory. As aforementioned, such a training sample space may be represented by an n×n matrix, where field (d,b) of the n×n matrix indicates the leaving b events during a specific past period when an object entering d event is observed. The above three characteristic functions may be estimated with the above probability function.

In summary, the disclosed exemplary embodiments may provide a system and method for moving object tracking in a non-overlapping sensor network. Object tracking may be performed in a sensor network with non-overlapping measurement range, and the disclosed exemplary embodiments do not need to know the scene blueprint of sensor deployment, and require no manual intervention during the learning process. By measuring the appearance and the time characteristic of the moving object and with machine learning and statistics, the disclosed exemplary embodiments observe a large amount of samples and automatically estimate camera spatial correlation, the distribution of leaving and entering time difference and the distribution of color difference of the object appearance and use the above as the basis for object tracking.

The sensors may also be other types of sensors. For example, the sensors may be color camera, and a camera network is constructed to track the moving object moving within the camera network. The sensor may also be black and white camera, thermal sensor camera, infrared camera, microphone, supersonic, laser distance measuring instrument, weight scale, and so on.

Although the present invention has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An object tracking method for a non-overlapping sensor network, applicable to a sensor network with a plurality of sensors, said method having a training phase and a detection phase, and comprising:
   in said training phase, obtaining a plurality of measured data through each of said plurality of sensors as training samples;
   marking out at least an entrance or exit within a measuring range of each of said plurality of sensors;
   estimating at least three characteristic functions related to an object to be tracked, including sensor spatial correlation function, moving time difference function and appearance similarity function, via an automatic learning method; and
   in said detection phase, using said at least three characteristic functions as basis for tracking said object and linking relationship of said object;
   wherein said automatic learning method is a recursive learning strategy; and wherein said recursive learning strategy further includes:
   (a) for each entering event occurring at each entrance or exit of each of said plurality of sensors, recording all leaving events during a past period in a training sample space;
   (b) with existing samples in said training sample space, estimating an entrance or exit correlation probability function, a moving time difference probability function and an appearance similarity difference probability function;
   (c) observing said appearance similarity difference probability function and removing data belonging to outliers statistically;
   (d) with remaining data, updating said moving time difference probability function and said appearance similarity difference probability function; and
   repeating steps (c) and (d) until said moving time difference probability function converges.

2. The method as claimed in claim 1, wherein said sensor spatial correlation function is the correlation of different entrances or exits of said plurality of sensors, said moving time difference is time difference between an object leaving and entering different field of views of said plurality of sensors, and said appearance similarity is difference between object appearance similarity.

3. The method as claimed in claim 1, wherein said at least three characteristic functions are all estimated with probability function.

4. The method as claimed in claim 1, wherein a mixture Gaussian model is used to approximate said appearance similarity difference probability model.

5. The method as claimed in claim 1, wherein another mixture Gaussian model is used to approximate said moving time difference probability function and observing whether data without concentrate trend is removed before updating said moving time difference probability function.

6. The method as claimed in claim 1, wherein removal of said outlier data is determined by whether the value of said appearance similarity difference probability function is less than a preset value.

7. The method as claimed in claim 5, wherein when the value of said moving time difference probability function is less than another preset value, data without concentrate trend is removed.

8. The method as claimed in claim 1, wherein said training sample space is represented with an n×n matrix, n is the total number of entrances or exits of said plurality of sensors, each field (d,b) of said matrix stores all related pairs of leaving and entering events to indicate that all events leaving entrance or exit b during a past period when an event that an object entering entrance or exit d is observed.

9. The method as claimed in claim 2, wherein said basis for object tracking and relationship linking is positively proportional to said appearance similarity, said moving time difference and said sensor spatial correlation.

10. The method as claimed in claim 1, wherein convergence of said moving time difference probability function is determined by whether number of removed events is less than a preset number.

11. The method as claimed in claim 10, wherein data of remaining events are used to estimate said entrance or exit correlation probability function.

12. An object tracking system for a non-overlapping sensor network, comprising:
   a plurality of sensors, at least an entrance or exit being marked out for each of said plurality of sensors;
   a training-phase processing module that obtains a plurality of measured data as training samples through each of said plurality of sensors, and records all leaving events during a past period in a training sample space for each entering event at each entrance or exit of each of said plurality of sensors;

a characteristic function estimating and updating module, with existing samples in said training sample space and through an automatic learning method, estimating at least three characteristic functions related to an object to be tracked, including sensor spatial correlation function, moving time difference function and appearance similarity function; and a detection-phase tracking module that uses estimated said three characteristic functions as basis for tracking said object and linking relationship of said object;

wherein said automatic learning method is a recursive learning strategy; and wherein said recursive learning strategy includes:

(a) for each entering event occurring at each entrance or exit of each of said plurality of sensors, recording all leaving events during a past period in a training sample space;

(b) with existing samples in said training sample space, estimating an entrance or exit correlation probability function, a moving time difference probability function and an appearance similarity difference probability function;

(c) observing said appearance similarity difference probability function and removing data belonging to outliers statistically;

(d) with remaining data, updating said moving time difference probability function and said appearance similarity difference probability function; and repeating steps (c) and (d) until said moving time difference probability function converges.

13. The system as claimed in claim 12, wherein said training-phase processing module has a memory and said training sample space is allocated in said memory.

14. The system as claimed in claim 13, wherein said training sample space is represented with an n×n matrix, n is the total number of entrances or exits of all said sensors, each field (d,b) of said matrix stores all related pairs of leaving and entering events to indicate that all events leaving entrance or exit b during a past period when an event that an object entering entrance or exit d is observed.

15. The system as claimed in claim 13, wherein said plurality of sensors are deployed in a sensor network with non-overlapping measurement range.

16. The system as claimed in claim 12, wherein said plurality of sensors are selected from the types of sensors including color camera, black and white camera, thermal sensor camera, infrared camera, microphone, supersonic, laser distance measuring instrument, and weight scale.

* * * * *